US007722451B2

(12) United States Patent
Hughs-Baird et al.

(10) Patent No.: US 7,722,451 B2
(45) Date of Patent: *May 25, 2010

(54) GAMING DEVICE HAVING IMPROVED OFFER AND ACCEPTANCE GAME WITH MASKED OFFERS

(75) Inventors: Andrea Hughs-Baird, Reno, NV (US); Brian D. Swift, Sparks, NV (US)

(73) Assignee: IGT, Reno, NV (US)

( * ) Notice: Subject to any disclaimer, the term of this patent is extended or adjusted under 35 U.S.C. 154(b) by 716 days.

This patent is subject to a terminal disclaimer.

(21) Appl. No.: 10/086,014

(22) Filed: Feb. 28, 2002

(65) Prior Publication Data

US 2003/0162584 A1 Aug. 28, 2003

(51) Int. Cl.
*A63F 13/00* (2006.01)

(52) U.S. Cl. ................................ 463/9; 463/16; 463/31

(58) Field of Classification Search ..................... 463/1, 463/9–13, 16–22, 31; 273/143 R
See application file for complete search history.

(56) References Cited

U.S. PATENT DOCUMENTS

| | | | |
|---|---|---|---|
| 4,448,419 A | | 5/1984 | Telnaes |
| 4,582,324 A | | 4/1986 | Koza et al. |
| 4,624,459 A | | 11/1986 | Kaufman |
| 4,695,053 A | | 9/1987 | Vazquez, Jr. et al. |
| 4,991,848 A | | 2/1991 | Greenwood et al. |
| 5,178,390 A | | 1/1993 | Okada |
| 5,205,555 A | | 4/1993 | Hamano |
| 5,342,047 A | | 8/1994 | Heidel et al. |
| 5,456,465 A | | 10/1995 | Durham |
| 5,511,781 A | * | 4/1996 | Wood et al. ................... 463/12 |
| 5,524,888 A | | 6/1996 | Heidel |
| 5,536,016 A | | 7/1996 | Thompson |
| 5,542,669 A | | 8/1996 | Charron et al. |
| 5,560,603 A | | 10/1996 | Seelig et al. |

(Continued)

FOREIGN PATENT DOCUMENTS

| | | | |
|---|---|---|---|
| EP | 0874337 | A1 | 10/1998 |

(Continued)

OTHER PUBLICATIONS

Addams Family Advertisement and Article written by IGT, Strictly Slots, published in 2000.

(Continued)

*Primary Examiner*—Dmitry Suhol
*Assistant Examiner*—Robert Mosser
(74) *Attorney, Agent, or Firm*—K&L Gates LLP

(57) ABSTRACT

A gaming device having an improved offer and acceptance bonus scheme wherein the gaming device provides a plurality of masked selections and briefly reveals to the player one or more of the offers which will be associated with one or more of the masked selections. In one embodiment, one offer is revealed and that revealed offer is the maximum potential offer the player may obtain. In one embodiment, if the player selects the revealed offer, the game ends. In one embodiment, if the maximum offer is not selected, the player simply obtains the selected offer and the game ends. In another embodiment, the player may select the offer, or reject the offer and select another masked selection wherein the player may again obtain the previously selected offer.

9 Claims, 7 Drawing Sheets

U.S. PATENT DOCUMENTS

| | | | |
|---|---|---|---|
| 5,611,535 | A | 3/1997 | Tiberio |
| 5,711,525 | A | 1/1998 | Breeding |
| 5,769,716 | A | 6/1998 | Saffari et al. |
| 5,772,509 | A | 6/1998 | Weiss |
| 5,775,692 | A | 7/1998 | Watts et al. |
| 5,788,573 | A | 8/1998 | Baerlocher et al. |
| 5,823,874 | A | 10/1998 | Adams |
| 5,833,538 | A | 11/1998 | Weiss |
| 5,848,932 | A | 12/1998 | Adams |
| 5,851,148 | A | 12/1998 | Brune et al. |
| 5,855,514 | A | 1/1999 | Kamille |
| 5,873,781 | A | 2/1999 | Keane |
| 5,882,261 | A | 3/1999 | Adams |
| 5,902,184 | A | 5/1999 | Bennett et al. |
| 5,911,418 | A | 6/1999 | Adams |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,798 | A | 8/2000 | Bennett |
| 6,120,031 | A | 9/2000 | Adams |
| 6,126,541 | A | 10/2000 | Fuchs |
| 6,126,542 | A | 10/2000 | Fier |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,483 | B1 | 5/2001 | Mayeroff |
| 6,231,442 | B1 | 5/2001 | Mayeroff |
| 6,231,445 | B1 | 5/2001 | Acres |
| 6,261,177 | B1 | 7/2001 | Bennett |
| 6,302,790 | B1 | 10/2001 | Brossard |
| 6,305,686 | B1 | 10/2001 | Perrie et al. |
| 6,309,300 | B1 | 10/2001 | Glavich |
| 6,328,649 | B1 | 12/2001 | Randall et al. |
| 6,375,187 | B1 | 4/2002 | Baerlocher |
| 6,398,218 | B1 | 6/2002 | Vancura |
| 6,413,160 | B1 | 7/2002 | Vancura |
| 6,435,511 | B1 | 8/2002 | Vancura et al. |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,569,015 | B1 | 5/2003 | Baerlocher et al. |
| 6,599,192 | B1 | 7/2003 | Baerlocher et al. |
| 6,632,141 | B2 * | 10/2003 | Webb et al. .................. 463/20 |
| 6,648,754 | B2 * | 11/2003 | Baerlocher et al. ............ 463/17 |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,758,750 | B2 | 7/2004 | Baerlocher et al. |
| 6,786,820 | B2 | 9/2004 | Gerrard et al. |
| 6,793,579 | B2 | 9/2004 | Baerlocher et al. |
| 6,796,905 | B2 | 9/2004 | Baerlocher et al. |
| 6,808,452 | B2 | 10/2004 | Baerlocher et al. |
| 6,808,454 | B2 | 10/2004 | Gerrard et al. |
| 6,811,483 | B1 | 11/2004 | Webb et al. |
| 6,852,030 | B2 | 2/2005 | Baerlocher et al. |
| 6,890,257 | B2 | 5/2005 | Baerlocher |
| 6,899,623 | B2 | 5/2005 | Baerlocher |
| 6,942,566 | B2 | 9/2005 | Baerlocher et al. |
| 6,942,567 | B2 | 9/2005 | Baerlocher et al. |
| 6,960,132 | B2 | 11/2005 | Baerlocher et al. |
| 6,966,833 | B2 | 11/2005 | Kaminkow et al. |
| 6,971,953 | B2 | 12/2005 | Gerrard et al. |
| 2002/0187827 | A1 | 12/2002 | Blankstein |
| 2004/0038729 | A1 | 2/2004 | Webb et al. |
| 2004/0180710 | A1 | 9/2004 | Palmer et al. |
| 2004/0185928 | A1 | 9/2004 | Baerlocher et al. |
| 2004/0214632 | A1 | 10/2004 | Cuddy et al. |
| 2005/0020346 | A1 | 1/2005 | Baerlocher |
| 2005/0032567 | A1 | 2/2005 | Baerlocher et al. |
| 2005/0037829 | A1 | 2/2005 | Baerlocher et al. |
| 2005/0101375 | A1 | 5/2005 | Webb et al. |
| 2005/0130729 | A1 | 6/2005 | Baerlocher et al. |
| 2005/0187010 | A1 | 8/2005 | Baerlocher |
| 2005/0266914 | A1 | 12/2005 | Baerlocher et al. |
| 2006/0003837 | A1 | 1/2006 | Baerlocher et al. |

FOREIGN PATENT DOCUMENTS

| | | | |
|---|---|---|---|
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| WO | WO 9732285 | | 9/1997 |
| WO | WO 00/12186 | | 3/2000 |

OTHER PUBLICATIONS

Adders and Ladders Advertisement written by Barcrest Ltd., published prior to 2000.

American Thunder Screen Shots written by IGT, published in 1998.

Big Bang Piggy Bankin Advertisement written by WMS Gaming, Inc., published prior to 2000.

Blackjack/Twenty-One Description written by Hoyle's Rules of Games, published in 1993.

Bonus Spin Red, White & Blue Advertisement written by IGT, published in 2000.

Bonus Times Article written by Strictly Slots, published in 2000.

By George written by IGT, published in 2002.

Caribbean Gold II Advertisement written by Aristocrat Incorporated, published in 1998.

Cash Box Advertisement & Article written by Anchor Games, Strictly Slots, published in 2000.

Chutes & Ladders Game Instructions written by Hasbro-Milton Bradley, published in 1999.

Description of Let's Make a Deal Television Show written by letsmakeadeal.com (2 pages), printed on Mar. 16, 2001.

Double Diamond Game Descriptions written by IGT printed on Mar. 21, 2001.

Double Up Poker Game Description written by IGT Undated.

Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat On Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make a Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Top Dollar Game Advertisement written by IGT, published in 1998.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

GAMING DEVICE HAVING IMPROVED OFFER AND ACCEPTANCE GAME WITH MASKED OFFERS

CROSS REFERENCE TO RELATED APPLICATIONS

This application is related to the following commonly-owned co-pending patent applications: "GAMING DEVICE HAVING SEPARATELY CHANGEABLE VALUE AND MODIFIER BONUS SCHEME," Ser. No. 09/626,045, "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 09/686,409, "GAMING DEVICE HAVING VALUE SELECTION BONUS," Ser. No. 09/684,605, "GAMING DEVICE HAVING RISK EVALUATION BONUS ROUND," Ser. No. 09/688, 434"GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 09/680,630, "GAMING DEVICE HAVING IMPROVED AWARD OFFER BONUS SCHEME," Ser. No. 09/682,368, "GAMING DEVICE HAVING OFFER ACCEPTANCE GAME WITH TERMINATION LIMIT," Ser. No. 09/822, 711,"GAMING DEVICE HAVING OFFER/ACCEPTANCE ADVANCE THRESHOLD AND LIMIT BONUS SCHEME," Ser. No. 09/838,014, "GAMING DEVICE HAVING AN OFFER AND ACCEPTANCE SELECTION BONUS SCHEME WITH A TERMINATOR AND AN ANTI-TERMINATOR," Ser. No. 09/945,082, "GAMING DEVICE HAVING AN AWARD OFFER AND TERMINATION BONUS SCHEME," Ser. No. 09/682,428, "GAMING DEVICE HAVING AN OFFER AND ACCEPTANCE GAME WITH A PLAYER SELECTION FEATURE," Ser. No. 10/086,078, "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862, "GAMING DEVICE HAVING IMPROVED OFFER AND ACCEPTANCE BONUS SCHEME," Ser. No. 10/074,273, "GAMING DEVICE HAVING AN OFFER/ACCEPTANCE GAME WITH MULTI-OFFER SYMBOL," Ser. No. 10/245, 387, "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134, "GAMING DEVICE HAVING A DESTINATION PURSUIT BONUS SCHEME WITH ADVANCED AND SETBACK CONDITIONS," Ser. No. 10/288,750, "GAMING DEVICE HAVING IMPROVED AWARD OFFER BONUS SCHEME," Ser. No. 10/290,800, "GAMING DEVICE HAVING VALUE SELECTION BONUS,"Ser. No. 10/306,295, "GAMING DEVICE HAVING IMPROVED AWARD OFFER BONUS SCHEME," Ser. No. 10/318,752, and "GAMING DEVICE HAVING VALUE SELECTION BONUS," Ser. No. 10/354, 514.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device having an improved offer and acceptance game.

BACKGROUND OF THE INVENTION

Gaming devices, such as slot machines, having primary and secondary or bonus games or schemes are well known. One well known bonus game provides a player with a series of award offers consisting of credits or dollars. The player may either accept each award offer or reject each award offer; however, the player must accept the final award offer. If the player accepts an award offer, the player keeps the award offered to the player. If the player rejects the award offer, the gaming device provides another award offer to the player except if the award offer is the final award offer. The award offers are randomly determined from a series of award offers of differing values.

While this type of gaming device has achieved significant popularity in the gaming industry, after playing the game repeatedly, players may lose interest in the game. Accordingly, there is a need for new gaming devices related to this type of offer and acceptance bonus scheme.

SUMMARY OF THE INVENTION

The present invention provides a gaming device having an improved offer and acceptance game and particularly a bonus game. In one embodiment of the present invention, the gaming device provides the player an opportunity to select an offer provided to the player during the bonus game from a plurality of masked selections. A value is associated with each masked selection. The player selects one of the masked selections and the gaming device reveals the value associated with that masked selection. The revealed value is the player's offer. If the player accepts the offer, the player obtains the offer and the bonus game ends. If the player rejects the offer, and the offer is not the final offer, the player may make another selection from the plurality of masked selections. The values may be randomly determined or arranged prior to or during the selection process from a pool of values. The value associated with the rejected offer remains in the pool of values and may be reassociated with another masked selection for the player's subsequent selections. In one embodiment, after each selection the gaming device reveals the values associated with the non-selected masked selections.

In an alternative embodiment of the present invention, the gaming device provides the player with a plurality of masked selections. The gaming device briefly reveals to the player one or more of the values which will be associated with one or more of the masked selections. The gaming device conceals all of the values including the revealed value and displays the plurality of selections being shuffled into a different configuration. The player is prompted to pick the selection with the maximum associated value. The gaming device reveals to the player the value associated with the selection picked by the player. The revealed value is the player's offer. If the player selected the maximum value, the player obtains that value as their bonus award and the bonus game ends. If the maximum value is not selected, the player simply obtains the value associated with their selected masked selection and the game ends.

In one alternative embodiment, if the offer is not the final offer, the player may accept the offer or the player may attempt to reselect the maximum value revealed to the player. If the offer is rejected, the value associated with the rejected offer may be reassociated with another selection and selected again in a subsequent selection by the player. If the offer is rejected, the gaming device displays the plurality of masked selections being reshuffled into a different configuration and the bonus game proceeds as described above. The bonus round continues until either the player accepts an offer or the player has completed a predetermined number of opportunities to select masked selections. In the case where the player rejects all of the offers prior to the last possible offer, the gaming device provides the player with the last offer, which the player cannot reject. It should thus be appreciated that the present invention provides an improved offer and acceptance bonus game in which the player, and not the gaming device, selects the outcome of the bonus game and particularly the offers provided to the player. It should also be appreciated that the present invention may be adapted for a primary game.

It is therefore an advantage of the present invention to provide a gaming device having an improved offer and acceptance game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
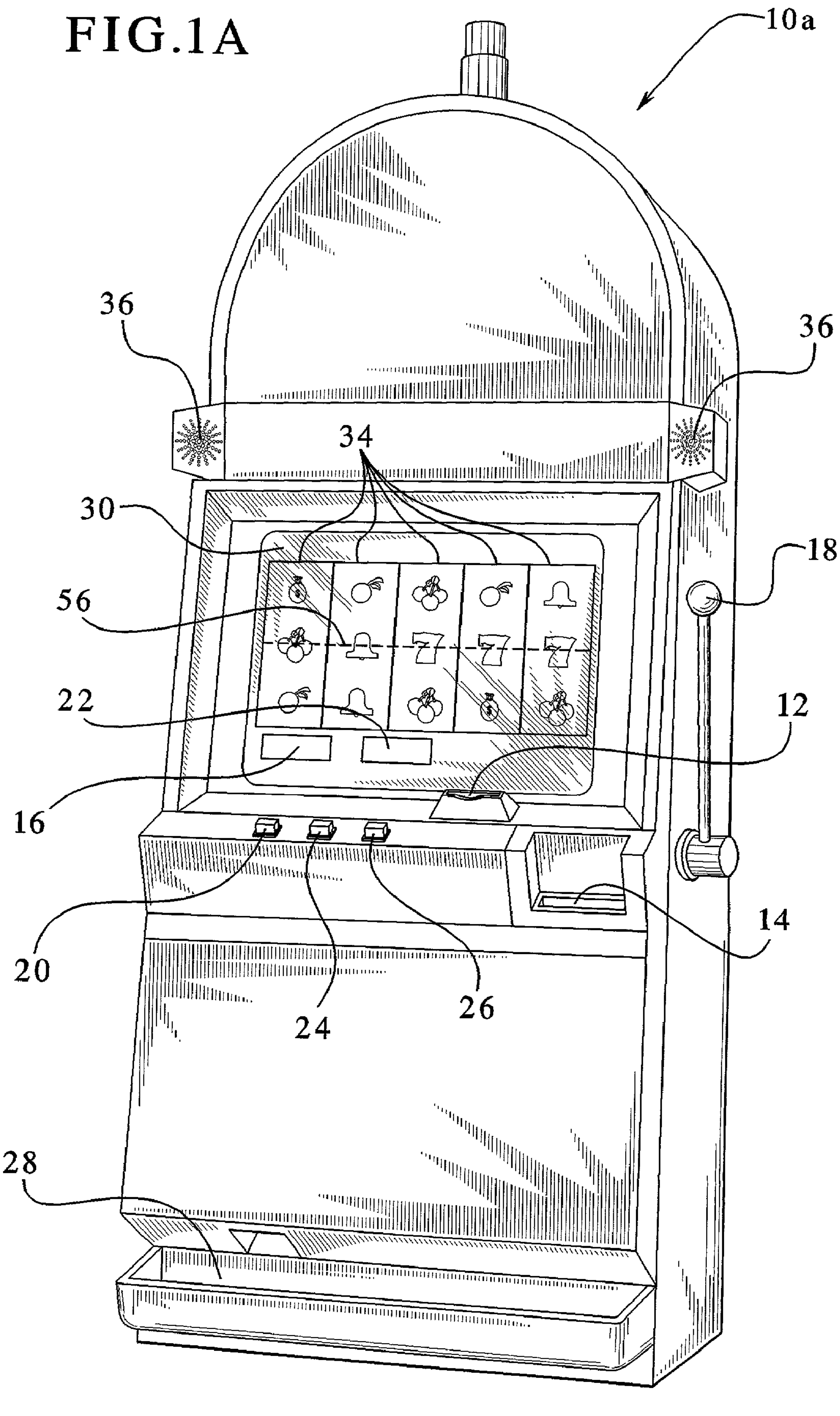
FIGS. 1A and 1B are perspective views of alternative embodiments of the gaming device of the present invention.
Figure 1B:
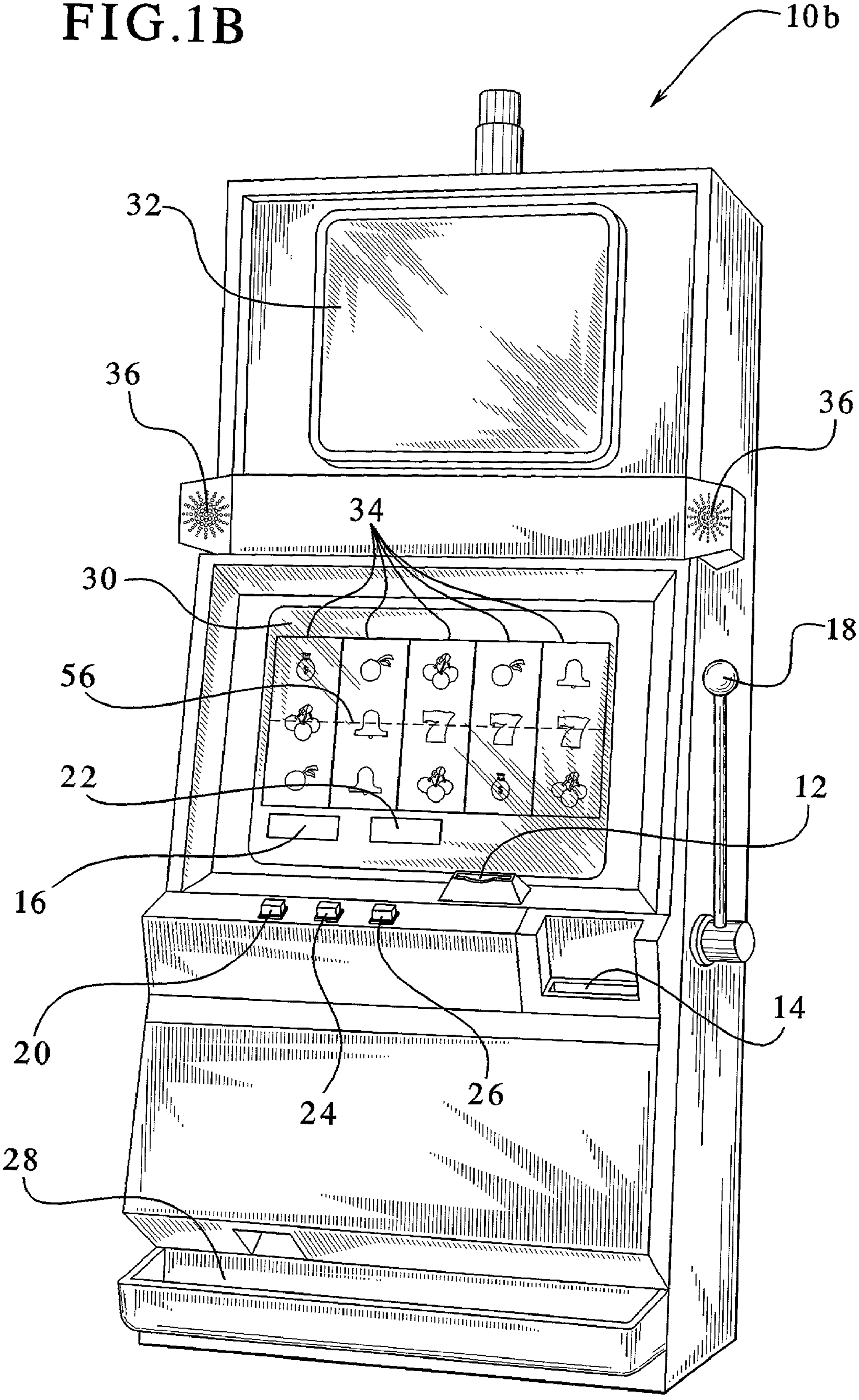

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. In one embodiment, gaming device 10 is preferably a slot machine having the controls, displays and features of a conventional slot machine. It is constructed so that a player can operate it while standing or sitting, and gaming device 10 may be mounted in console or cabinet. However, it should be appreciated that gaming device 10 can be constructed as a pub-style tabletop game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker, blackjack or keno, any of their bonus triggering events and any of their bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device can include other wager indicators such as a bet max button.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism or apparatus. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
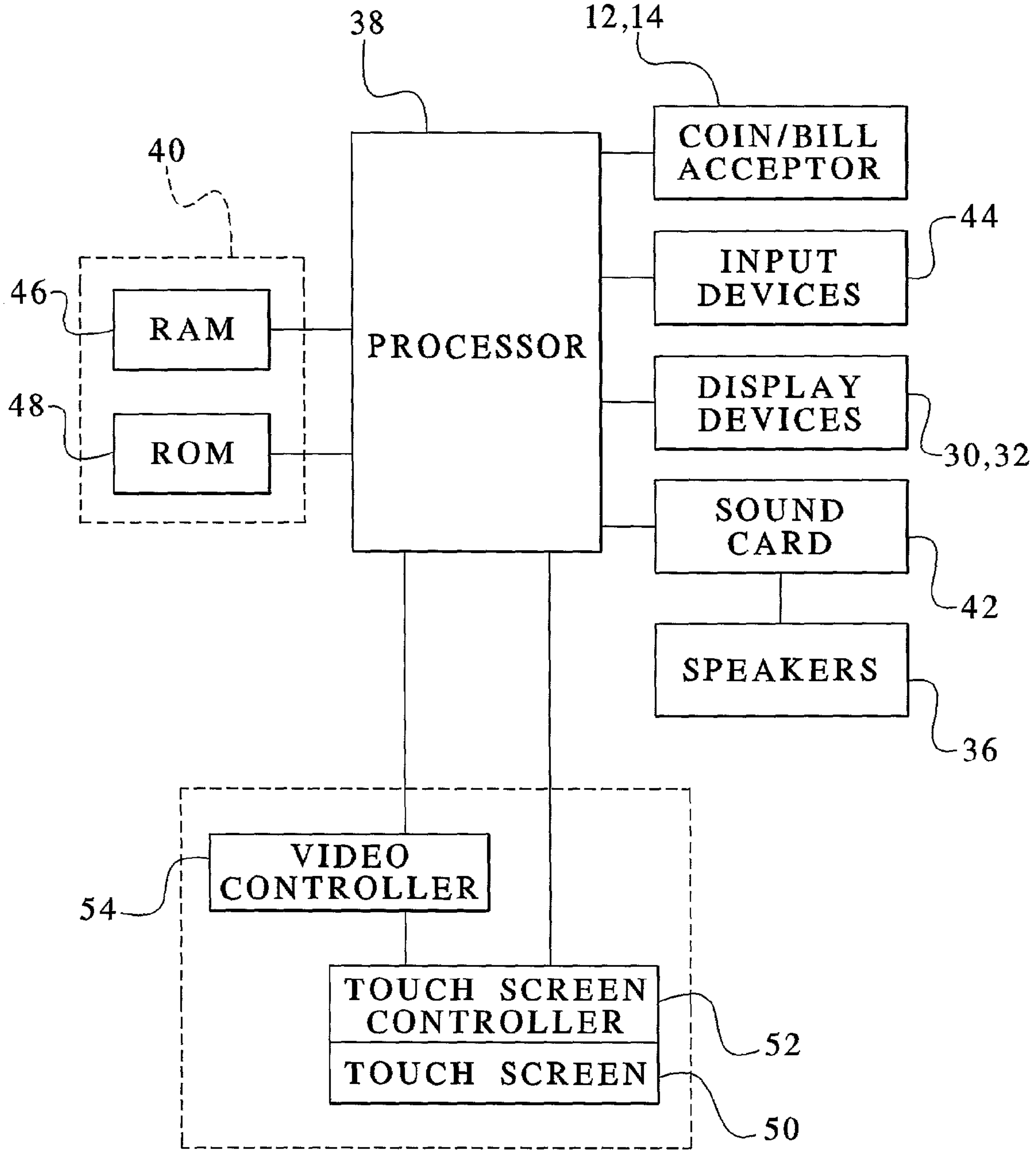
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. In one embodiment, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines displayed in a horizontal and/or diagonal fashion.

Offer Acceptance Game

Figure 3A:
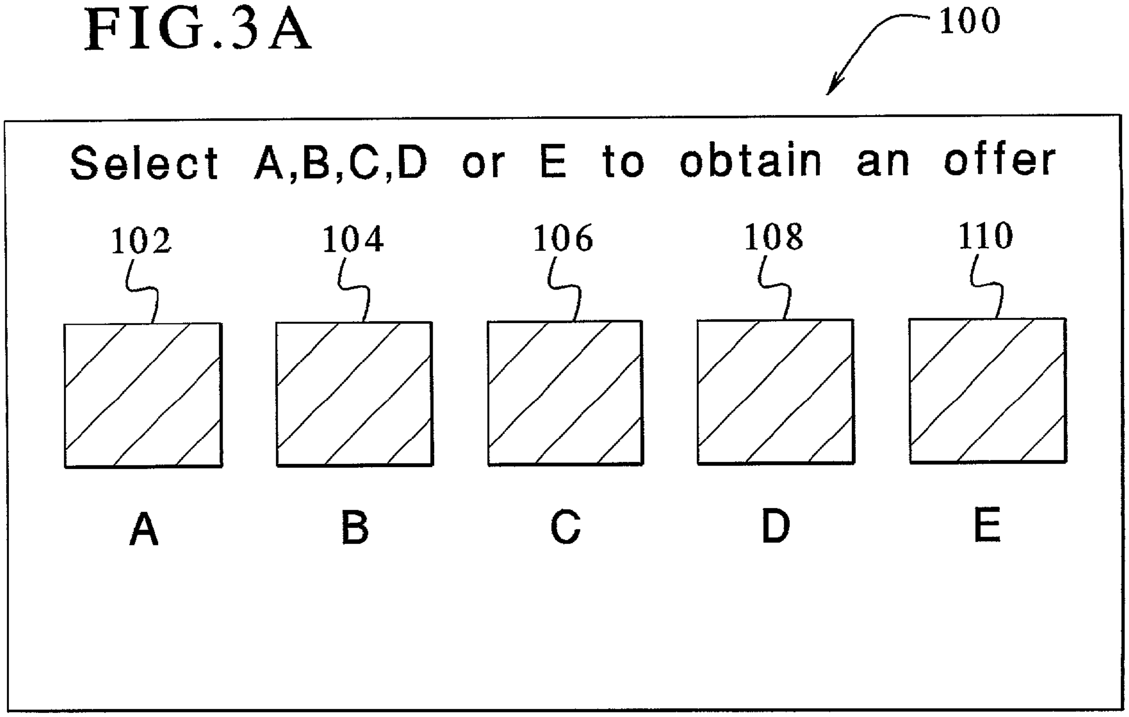
FIG. 3A is a front elevation view of the offer selection screen of one embodiment of the present invention illustrating a plurality of selections which the player can select to obtain an offer.
Figure 3B:
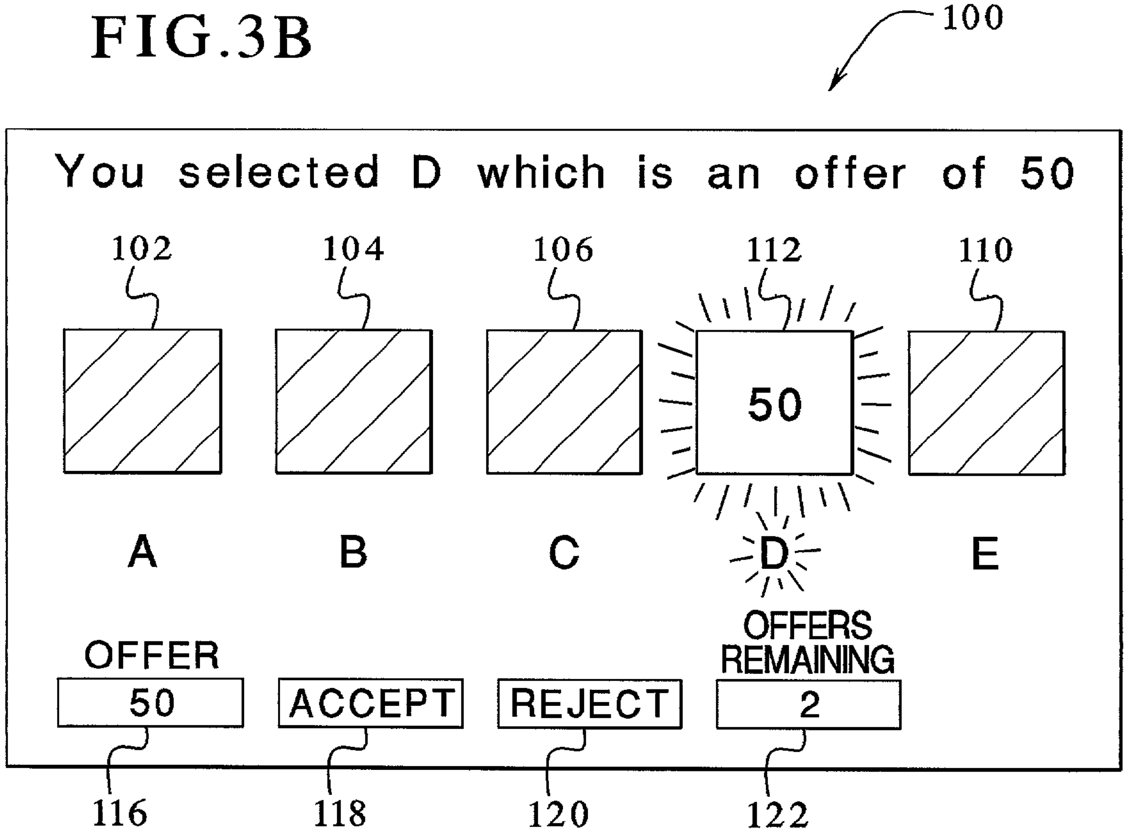
FIG. 3B is a front elevation view of the offer selection screen of one embodiment of the present invention illustrating the offer chosen by the player.

For purposes of this description, "bonus scheme" or "bonus game" refers to the entire process of the player obtaining a bonus award. The term "bonus round" refers to each time the player has an opportunity in a bonus scheme or bonus game to accept or reject an offer. Referring now to FIGS. 3A and 3B, one embodiment of the bonus game of the present invention provides a screen or display 100 which is preferably a touch screen that enables the player to make a selection to obtain or be offered an offer. The game preferably provides a plurality of masked selections which the player may select from. A value is associated with each masked selection and the selections do not initially reveal or display the value associated with each selection. It should be appreciated that the associated value may be a credit amount, a dollar amount or any other award, such as a car.

In one embodiment, the gaming device randomly selects the values to be associated with the masked selections from a pre-determined pool of values. Alternatively, the gaming device may have multiple pre-determined pools of values to select from. In an alternative embodiment, the gaming device randomly selects the values from a pre-determined range of value amounts. The value associated with each selection is preferably randomly determined prior to each time the player is allowed to pick a masked selection in each bonus round. In another embodiment, the value associated with each selection may be randomly determined after the player has rejected a pre-determined number of selections.

The number of possible values to be associated with the masked selections may be greater than, less than or equal to the number of possible masked selections for the player to select. In one embodiment, once a value is associated with a masked selection, that value may not be associated with another masked selection during a particular bonus round. In another embodiment, the same value may be associated with a plurality of masked selections in each bonus round.

Referring now to FIGS. 3A and 3B, in one example of the present invention, there are five selections 102, 104, 106, 108 and 110 respectively labeled A, B, C, D and E. Each selection has a value associated with it. The player chooses one of selection A, selection B, selection C, selection D and selection E to reveal an associated value. The revealed value is the player's offer. When the player makes a selection as indicated by highlighted selection 112 in FIG. 3B, the gaming device reveals the value associated with the chosen selection. In FIG. 3B, the player picked selection D which had an associated value of fifty credits, and thus the players offer is fifty credits. Appropriate messages such as "SELECT A, B, C, D OR E TO OBTAIN AN OFFER" and "YOU SELECTED D WHICH IS AN OFFER OF 50 CREDITS" are preferably provided to the player visually, or through suitable audio or audiovisual displays. It should be appreciated that selections 102, 104, 106 and 110 remain masked. In an alternative embodiment, the gaming device reveals the maximum value associated with a masked selection as discussed below.

As further illustrated in FIG. 3B, the gaming device provides the player with an offer and acceptance display, which is preferably a touch screen which provides the player with the offer 116, and the number of remaining opportunities to select a masked selection or offers 122 the player has remaining in the bonus game. The number of opportunities for the player may be preset or randomly determined. For increased entertainment, the number of remaining opportunities in the bonus game may not be revealed to the player. If the player has remaining opportunities to select a masked selection, then the player may accept the offer using an accept indicator 118 or reject the offer using a reject indicator 120. If the player accepts the offer, the gaming device provides the player with the offer, the player cannot obtain any more offers and the bonus game terminates. If the player rejects the offer, except if the award offer is the final award offer, then the gaming device randomly reassigns or reassociates the values with the masked selections and a subsequent bonus round proceeds as described above. If the player rejects all of the offers (prior to the last offer), the gaming device provides the player with the last offer. The player cannot reject the last offer.

It should thus be appreciated that if the player rejects an offer, the value associated with that rejected offer is available for the gaming device to reassign or reassociate with another masked selection in subsequent rounds. In the above example, if the player rejects the offer of fifty credits, then the fifty credits value could be reassociated with another selection in subsequent rounds. It should be appreciated that after an offer is rejected, in subsequent rounds the gaming device may select values to be associated with the masked selections from the same pool or from a different pool of values. In the embodiment where a value may only be associated with one selection, after the value is revealed and rejected by player, the gaming device reinserts the rejected value into the pool of values to be reassociated with other masked selections in subsequent bonus rounds (i.e., allows that value to be associated with another masked selection in a bonus round).

Figure 4A:
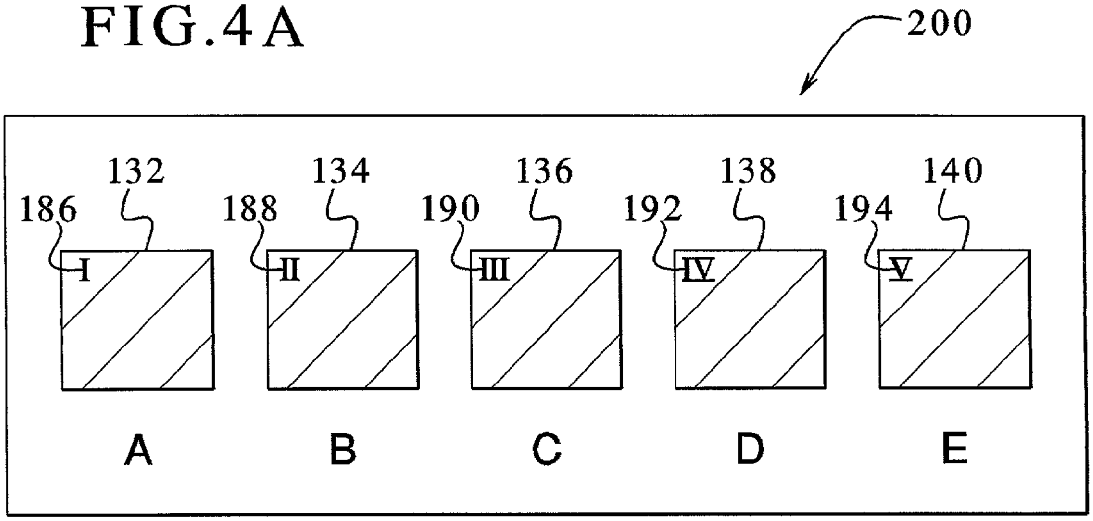
FIG. 4A is a front elevation view of the offer selection screen of an alternative embodiment of the present invention illustrating a plurality of selections which the player can select to obtain an offer.

Referring generally to FIGS. 4A, 4B, 4C, 4D and 4E an alternative embodiment of the present invention provides a screen or display 200 which is preferably a touch screen that enables the player to make a selection to obtain or be offered an offer. As seen in FIG. 4A, the game provides a plurality of selections from which the player may select. There are five selections 132, 134, 136, 138 and 140 respectively labeled A, B, C, D and E. For purposes of illustrating the selections being shuffled, the selections are also respectively marked I, II, III, IV and V, which are 186, 188, 190, 192 and 194, respectively. It should be appreciated that the selections are masked and the additional markings of I, II, III, IV and V are only to illustrate the shuffling process and are not displayed to the player. A predetermined or randomly determined value is associated with each selection and the selections do not initially display the value.

Figure 4B:
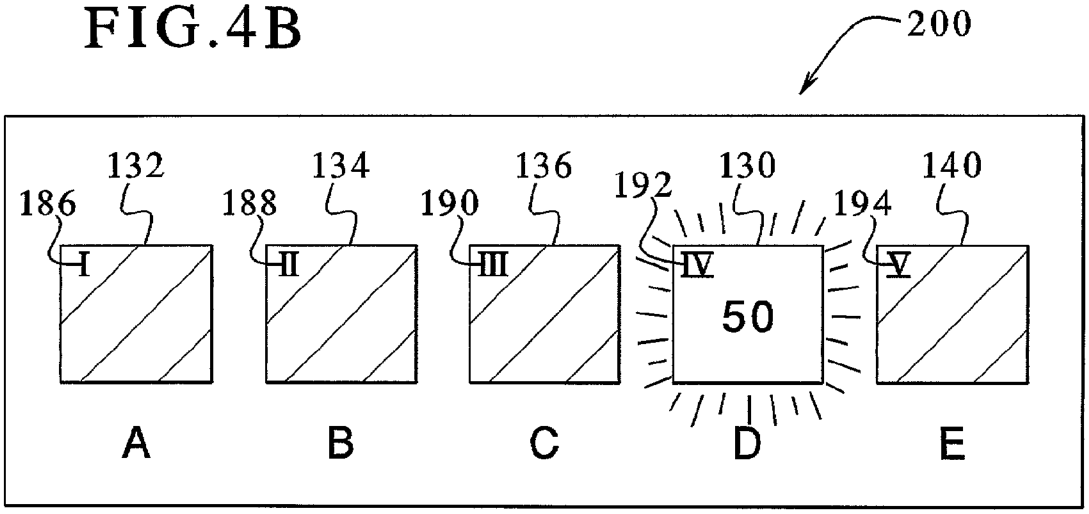
FIG. 4B is a front elevation view of the offer selection screen of an alternative embodiment of the present invention illustrating a value associated with a masked selection being revealed.

In one embodiment, the gaming device reveals to the player the values associated with one or multiple of the selections. In one preferred embodiment, as illustrated in FIG. 4B, the value revealed to the player 130 is the maximum value the player may obtain. In another embodiment, the value revealed is the minimum possible value the player may obtain. In another embodiment, the value revealed is an average of all of the possible values the player may obtain. In another embodiment, the value revealed is randomly determined from the pool of values that the player may obtain. In one embodiment of the present invention, using a re-reveal indicator, a player may prompt the gaming device to re-reveal the value or values associated with one or more of the selections.

Figure 4C:
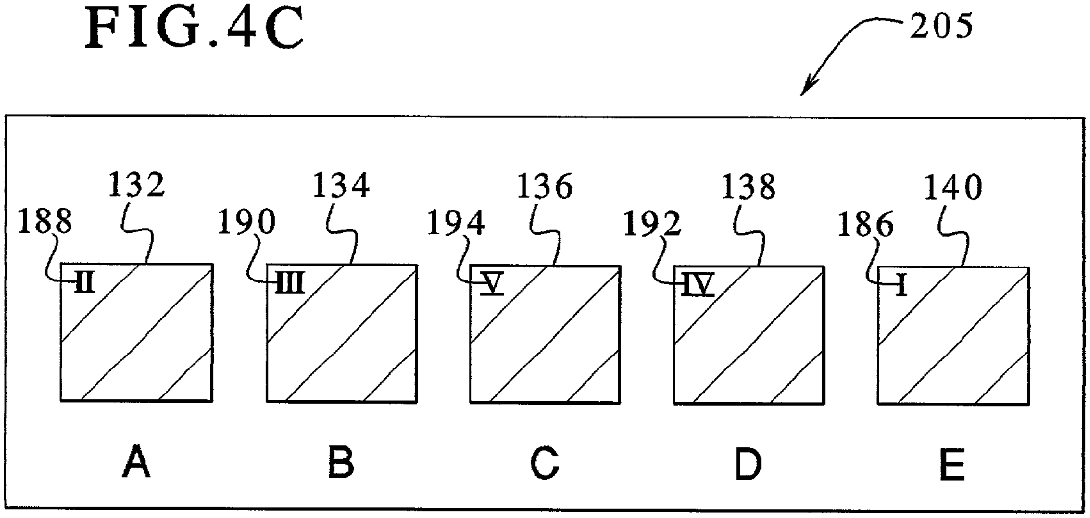
FIG. 4C is a front elevation view of the offer selection screen of an alternative embodiment of the present invention illustrating the gaming device shuffling the plurality of masked selections.

As illustrated in FIG. 4C, the gaming device displays the selections being mixed or shuffled into a new configuration 205. It should be appreciated that the entire mixing or shuffling process could be displayed to the player or could be hidden from the player. In an alternative embodiment, this process could simply be the association process whereby values are associated with the selections. As indicated in FIGS. 4A, 4B and 4C, by the reordering of I, II, III , IV and V, which are 186, 188, 190, 192 and 194, respectively, in FIGS. 4A and 4B, into the order of II, III, V, IV and I, which are 188, 190, 194, 192, 186, respectively, in FIG. 4C, the selections have been shuffled.

Figure 4D:
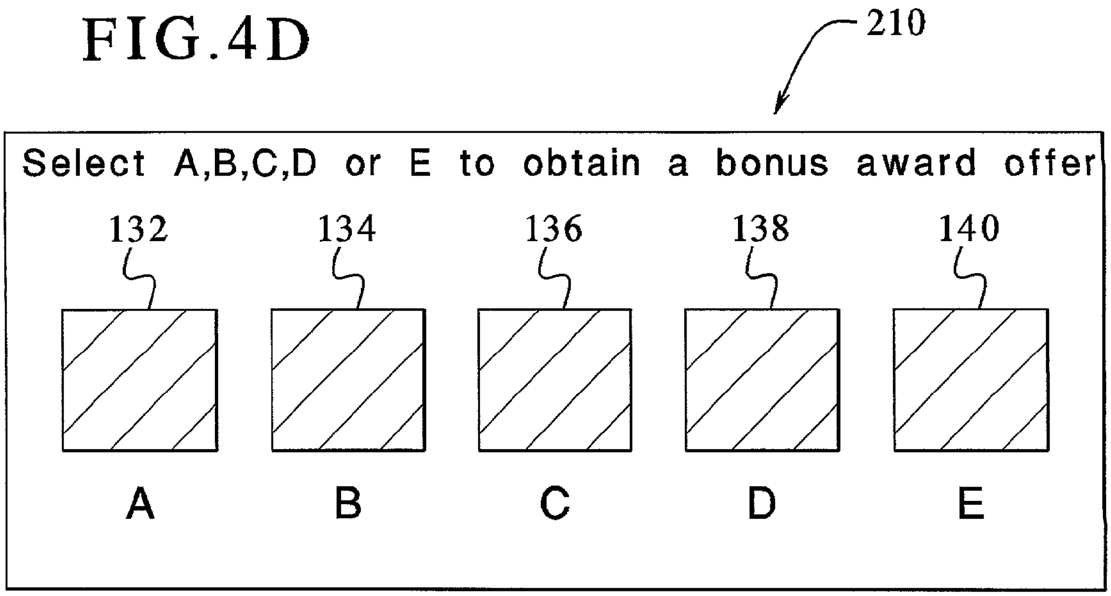
FIG. 4D is a front elevation view of the offer selection screen of an alternative embodiment of the present invention illustrating the plurality of shuffled masked selections with the player can selected to obtain an offer.
Figure 4E:
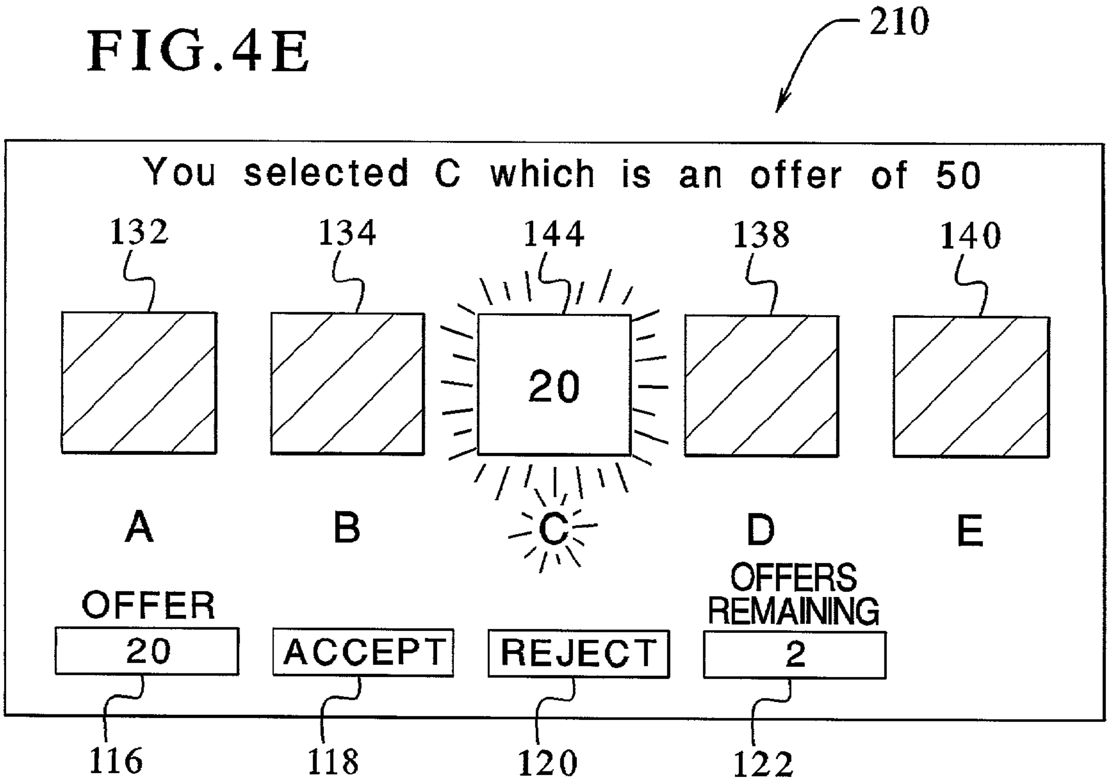
FIG. 4E is a front elevation view of the offer selection screen of an alternative embodiment of the present invention illustrating a player selecting one of said masked selections.

As illustrated in FIG. 4D, upon completion of the mixing, shuffling or value selection association, the gaming device prompts the player to pick one of the selections 210. In this example, the player must choose one of the five selections A, B, C, D or E, 132, 134, 136, 138 or 140, respectively. As illustrated in FIG. 4E, the player picks selection "C" highlighted on the display panel and the gaming device reveals the value associated with selection "C" 144. The revealed value is the player's offer. Appropriate messages such as "SELECT A, B, C, D OR E TO OBTAIN BONUS AWARD OFFER" and "YOU SELECTED C WHICH IS AN OFFER OF 20" are preferably provided to the player visually, or through suitable audio or audiovisual displays. In the example, as illustrated in FIG. 4E, the player picked selection "C" which had an associated value of 20 credits. After the gaming device displays the value associated with the picked selection, the player may accept or reject the revealed value as their offer as described above.

A preferred embodiment of the present invention involves the gaming device displaying three shells to the player. One of the shells is briefly raised to reveal a value underneath or a graphical representation of an award, such as a car symbol. The shell is lowered to re-conceal the value or award symbol. The gaming device displays the three shells being shuffled into a new configuration. The player is prompted to select the shell that is concealing the previously revealed value or award symbol. If the player selects the correct shell, then the player is awarded that value or award symbol. If the player does not select the correct shell, then the bonus scheme may provide the value or award symbol, if any, underneath the selected shell and terminate the bonus game or proceed as described above. It should be appreciated that in any embodiment, the player has a limited number of opportunities to select the shells.

Figure 5:
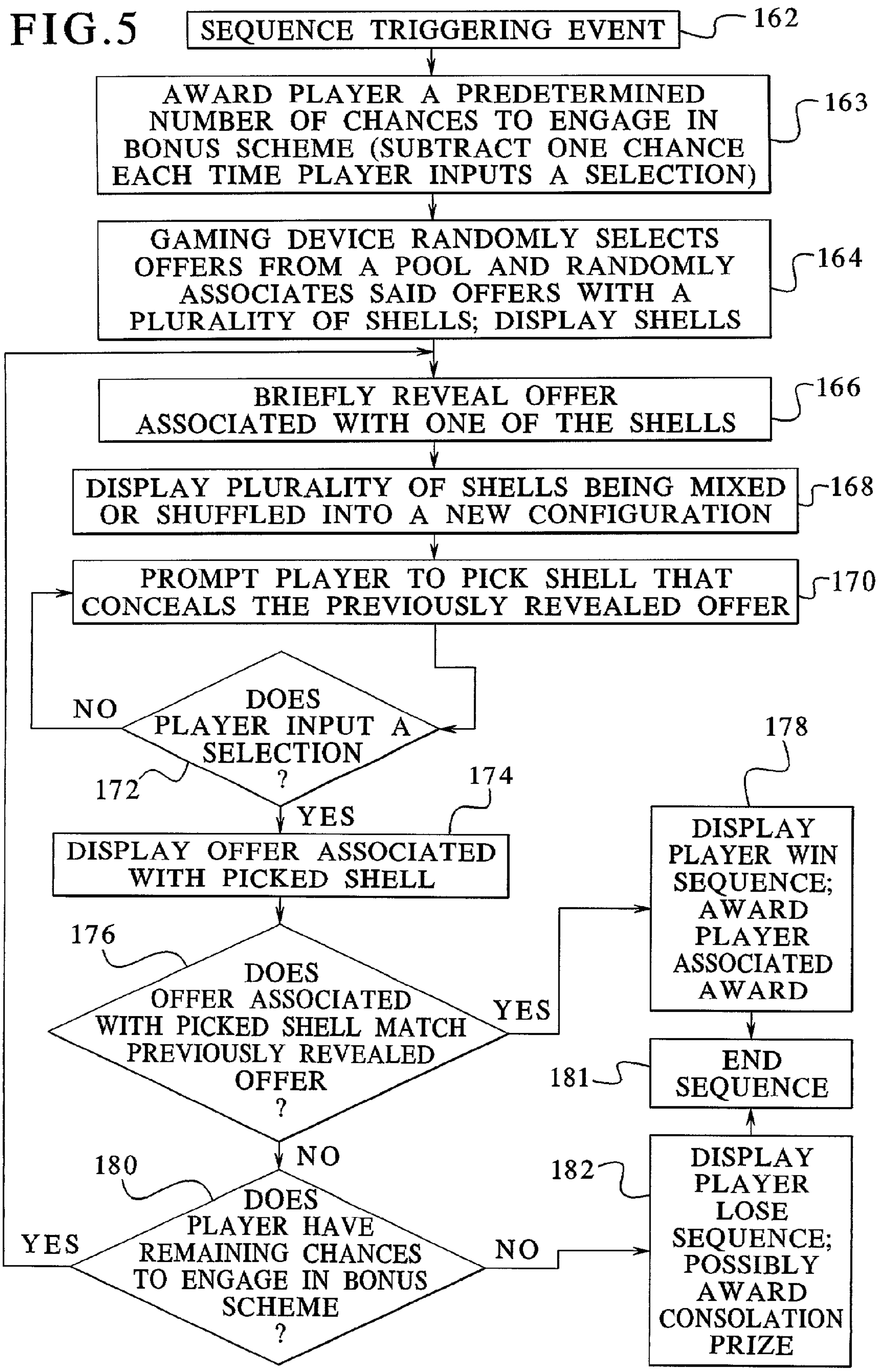
FIG. 5 is a flow diagram of one preferred embodiment of the present invention, wherein the player selects the outcome of the bonus game and the values associated with any rejected offers may be subsequently selected by the player.

Referring now to FIG. 5, a flow chart of this preferred embodiment of the present invention is illustrated, wherein the player attempts to select a particular selection after that selection has been mixed or shuffled among a plurality of identical selections. Upon a sequence triggering event, as indicated by the block 162, the game provides the player a plurality of opportunities as indicated by block 163. It should be noted that each time the player picks a selection, the opportunities to pick selections in the bonus scheme is reduced by one, until the player has no remaining opportunities to pick selections. The game randomly selects values from a pool of differing values and associates these selected values with a plurality of shells as indicated by block 164. The shells are displayed and the game briefly reveals a value associated with one shell as indicated by block 166. The game then displays the plurality of shells being mixed or shuffled into a new configuration, as indicated by block 168. The player is prompted to choose the shell concealing the previously revealed value as indicated by block 170. If the player does not pick a shell as indicated by diamond 172, the game awaits the players decision as indicated by block 170. After the player picks one of the shells, the value associated with the picked shell is displayed as indicated by block 174. If the value associated with the picked shell matches the previously revealed value, then a win display sequence is activated, the player is awarded the value associated with the picked shell as indicated by block 178 and the bonus scheme terminates as indicated by block 181. If the value associated with the picked shell does not match the previously revealed value, and if the player has no remaining opportunities to pick selections, then a player loss sequence is activated and the bonus game terminates as indicated by block 181. It should be appreciated that the player may be awarded a consolation prize as indicated by block 182. If the value associated with the picked shell does not match the previously revealed value and if the player has at least one remaining opportunities to pick selections in the bonus round as indicated by diamond 180, then the gaming device briefly reveals a value associated with one shell as indicated by block 166 and the game proceeds as described above.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device comprising:

an input device;

a display device;

a processor, and a memory device which stores a plurality of instructions, which when executed by the processor, cause the processor to operate with said display device and the input device to:

associate a plurality of values with a plurality of player selectable selections wherein each selection is associated with one of said values and each of said values is greater than zero, display to a player the association between at least one of the values associated with one of the selections and said selection, after displaying said association between at least one of the values associated with one of the selections and said selection:

(i) cause said association between at least one of the values associated with one of the selections and said selection to not be displayed to the player, and (ii) thereafter, display a rearrangement of the selectable selections in a manner discernable by the player prior to the player's selection of one of the selectable selections, wherein after the rearrangement of the selectable selections on the display, each selection remains associated with said previously associated value, after displaying the rearrangement of the selectable selections, enable the player to select one of the selections, and provide the player the value associated with the selected selection.

2. The gaming device of claim 1, wherein when executed by the processor, the plurality of instructions cause said processor to operate with the display device to reveal the values associated with non-chosen selections.

3. The gaming device of claim 1, wherein when executed by the processor, the plurality of instructions cause said processor to operate with the display device to reveal the maximum value associated with said selections prior to enabling the player to select one of said selections.

4. The gaming device of claim 1, wherein when executed by the processor, the plurality of instructions cause said processor to operate with the display device to reveal the minimum value associated with said selections prior to enabling the player to select one of said selections.

5. The gaming device of claim 1, wherein when executed by the processor, the plurality of instructions cause said processor to randomly determine which value associated with said selections to reveal to the player prior to enabling the player to select one of said selections.

6. The gaming device of claim 1, wherein when executed by the processor, the plurality of instructions cause said processor to operate with the display device to reveal a plurality but not all of values associated with said selections prior to enabling the player to select one of said selections.

7. The gaming device of claim 1, wherein when executed by the processor, the plurality of instructions cause the processor to enable the player to cause the processor to re-reveal a revealed value associated with said selections prior to enabling the player to select one of said selections.

8. A method for operating a game of a gaming device, said method comprising the steps of:

(a) causing a processor to operate with a memory device, a display device, and an input device to:

(i) trigger the game;

(ii) associate a plurality of values with a plurality of selections, wherein each of said values is greater than zero and each selection is associated with one of said values;

(iii) display said plurality of selections;

(iv) reveal one of said values associated with one of said selections to the player;

(v) after revealing to the player one of said values associated with one of said selections, conceal said revealed value from the player; and (vi) display a rearrangement of the selections in a manner discernable by a player prior to the player's pick of one of the selections, wherein after the rearrangement of the selections, each selection remains associated with said previously associated value;

(b) thereafter, enabling the player to pick one of the selections; and (c) causing the processor to operate with the memory device, the display device, and the input device to communicate said value associated with said picked selection to the player.

9. A gaming device operable under control of a processor, said gaming device comprising:

an input device;

a display device; and a memory device which stores a plurality of instructions, which when executed by the processor, cause the processor to operate with the display device and the input device to control a play of a game by:

(a) directly associating a plurality of offers with a plurality of player selectable selections, wherein each selection is associated with one of said offers, and each of said offers is greater than zero and payable to a player;

(b) enabling the player to select one of said selections;

(c) revealing the offer associated with the selected selection;

(d) enabling the player to accept or reject the revealed offer;

(e) if the player accepts the revealed offer, providing the revealed offer to the player;

(f) if the player rejects the revealed offer:

(i) concealing said revealed offer from the player, and (ii) thereafter, displaying a rearrangement of the selectable selections in a manner discernable by the player prior to the player's subsequent selection of one of the selectable selections, wherein after the rearrangement of the selectable selections by the display device, each selection remains associated with said previously associated offer;

(g) after displaying the rearrangement of the selectable selections, enabling the player to pick one of the selections; and (h) providing the player the offer associated with the picked selection.

* * * * *

UNITED STATES PATENT AND TRADEMARK OFFICE

CERTIFICATE OF CORRECTION

PATENT NO. : 7,722,451 B2
APPLICATION NO. : 10/086014
DATED : May 25, 2010
INVENTOR(S) : Hughs-Baird et al.

It is certified that error appears in the above-identified patent and that said Letters Patent is hereby corrected as shown below:

IN THE CLAIMS:

In Claim 3, Column 10, lines 19 and 20, replace “the maximum value” with --a maximum value--.

In Claim 4, Column 10, lines 24 and 25, replace “the minimum value” with --a minimum value--.

In Claim 6, Column 10, line 35, insert --the-- after “of”.

Signed and Sealed this

Seventeenth Day of August, 2010

David J. Kappos

David J. Kappos
*Director of the United States Patent and Trademark Office*